(12) United States Patent
Lu et al.

(10) Patent No.: US 9,519,815 B2
(45) Date of Patent: *Dec. 13, 2016

(54) OPTICAL INDICIA READING TERMINAL WITH COLOR IMAGE SENSOR

(71) Applicant: Honeywell Scanning and Mobility, Fort Mill, SC (US)

(72) Inventors: Jun Lu, Jiangsu (CN); Yong Liu, Jiangsu (CN); Ynjiun Paul Wang, Cupertino, CA (US)

(73) Assignee: Honeywell Scanning and Mobility, Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,533

(22) Filed: Feb. 12, 2016

(65) Prior Publication Data
US 2016/0162717 A1    Jun. 9, 2016

Related U.S. Application Data

(63) Continuation of application No. 14/355,613, filed as application No. PCT/CN2011/081870 on Nov. 7, 2011, now Pat. No. 9,262,660.

(51) Int. Cl.
*G06K 7/10* (2006.01)
(52) U.S. Cl.
CPC ............... *G06K 7/10722* (2013.01)

(58) Field of Classification Search
USPC ....................... 235/462.01–462.49
See application file for complete search history.

(56) References Cited

U.S. PATENT DOCUMENTS 6,598,798 B1 *   7/2003  Kashi .............. G06K 7/10722
                                         235/462.01

* cited by examiner

*Primary Examiner* — Jamara Franklin
(74) *Attorney, Agent, or Firm* — Additon, Higgins & Pendleton, P.A.

(57) ABSTRACT

An optical indicia reading terminal can comprise a microprocessor, a memory, and an image sensor integrated circuit for decoding decodable indicia. The image sensor integrated circuit can be configured to output a plurality of digital signals, each digital signal being representative of light incident on at least one pixel of the two-dimensional image sensor. The optical indicia reading terminal can be configured to selectively acquire a plurality of luminance signals from the plurality of digital signals. Whether the output image data from the sensor is digitally stored as YUV data or $YC_BC_R$ data, the terminal parses out the luminance signal, Y, in the data matrix to store a monochrome image for decoding. The optical indicia reading terminal can be configured to process the frame of image data for decoding decodable indicia.

20 Claims, 5 Drawing Sheets

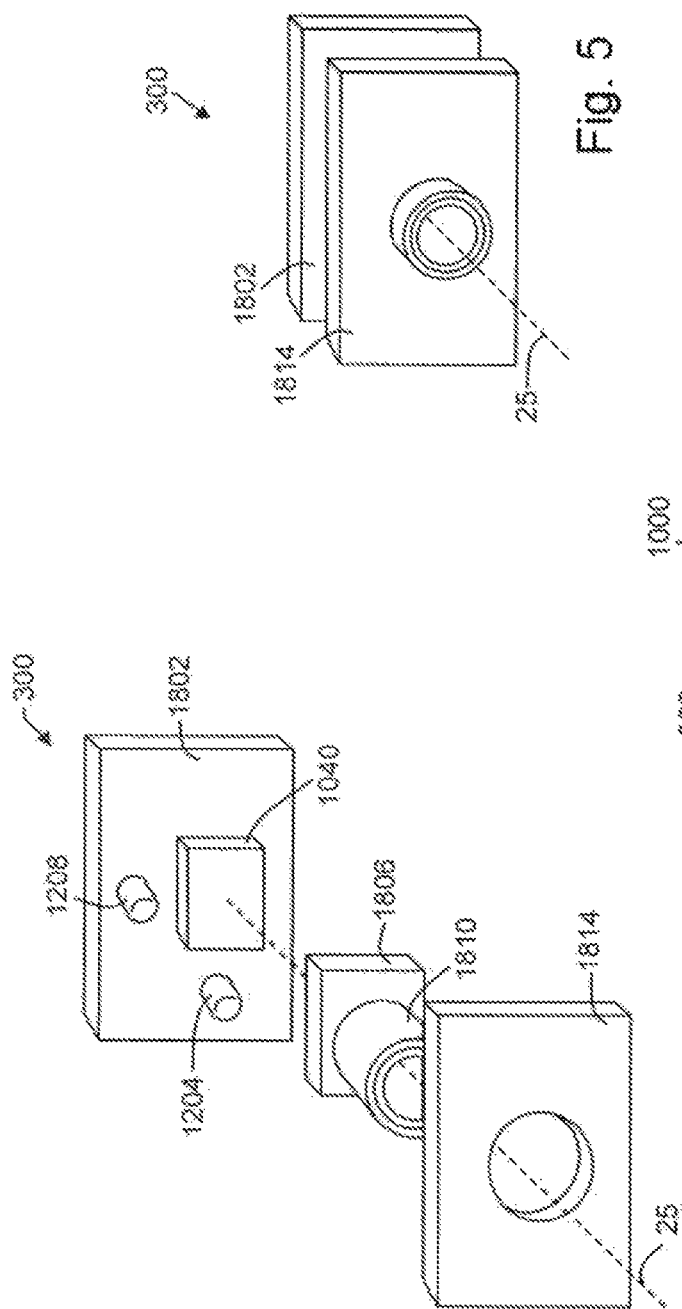

OPTICAL INDICIA READING TERMINAL WITH COLOR IMAGE SENSOR

CROSS-REFERENCE TO RELATED APPLICATIONS

The present application claims the benefit of U.S. patent application Ser. No. 14/355,613 for an Optical Indicia Reading Terminal With Color Image Sensor filed on May 1, 2014 (and published on Sep. 25, 2014 as U.S. Patent Publication No. 2014/0284384), now U.S. Pat. No. 9,262,660, which claims the benefit of International Application No. PCT/CN2011/081870 for an Optical Indicia Reading Terminal With Color Image Sensor filed on Nov. 7, 2011 (and published on May 16, 2013 as WIPO Publication No. WO 2013/067671). Each of the foregoing patent applications, patent publications, and patent is hereby incorporated by reference in its entirety.

FIELD OF THE INVENTION

The present invention relates to indicia reading terminals in general and in particular to an optical based indicia reading terminal.

BACKGROUND

Indicia reading terminals are available in multiple varieties. The well known gun style reader as commonly seen at retail store checkout counters is typically available in a form devoid of a keyboard and display. Enhanced functioning indicia reading terminals having keyboards, displays, and advanced networking communication capabilities are also available. Typically, indicia reading terminals have triggers or buttons for activating decoding attempts. Some indicia reading terminals employ color image sensors.

SUMMARY

There is provided an optical indicia reading terminal comprising a microprocessor, a memory, an image sensor integrated circuit including a two-dimensional image sensor, and a hand held housing encapsulating the two-dimensional image sensor. The image sensor integrated circuit can be configured to output a plurality of digital signals, each digital signal being representative of light incident on at least one pixel of the two-dimensional image sensor. The optical indicia reading terminal can be configured to store in the memory a frame of monochrome image data by selectively acquiring a plurality of luminance signals from the plurality of digital signals. Each luminance signal of the plurality of luminance signals can be representative of luminance of light incident on at least one pixel of the two-dimensional image sensor. The optical indicia reading terminal can be configured to process the frame of image data for decoding decodable indicia.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 4 is an exploded perspective view of an imaging module carrying a subset of circuits as shown in FIG. 2;

FIG. 5 is an assembled perspective view of the imaging module as shown in FIG. 4;

FIG. 6 is a perspective view of a hand held indicia reading terminal incorporating an imaging module as shown in FIGS. 4 and 5.

DETAILED DESCRIPTION

In one embodiment, there is provided an optical indicia reading terminal equipped with a two-dimensional color image sensor. Using color image sensor for reading optical indicia can be advantageous due to the fact that a color image sensor can also be used for other functions performed by an optical indicia reading terminal (e.g., still image or video capturing).

The associated image sensor circuitry can be configured to read out analog signals representative of light incident on image sensor pixels, to derive luminance signals from the read-out analog signals, and then to store a frame of monochrome image data in the terminal's memory by converting the luminance signals to digital values. The optical indicia reading terminal can be configured to process the frame of image data for decoding decodable indicia.

Figure 1:
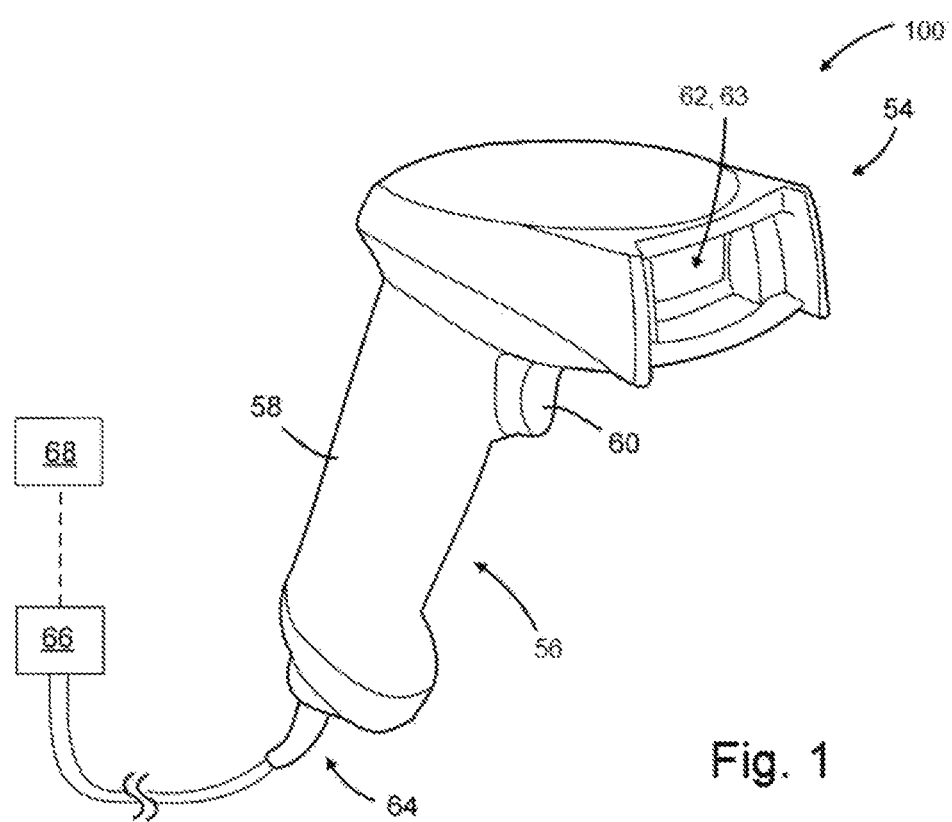
FIG. 1 schematically illustrates one embodiment of an optical indicia reading terminal.

In an illustrative embodiment, shown in FIG. 1, there is provided an optical indicia reading terminal 100 including a housing 52 comprising a head portion 54 and a handle portion 56, the latter further comprising a hand grip 58 and a trigger 60. The trigger 60 can be used to initiate signals for activating frame readout and/or certain decoding processes. Other components of optical indicia reading terminal 100 can be disposed within the housing 52. For example, an image sensor 62 can be disposed in the head portion 54 behind a housing window 63. The image sensor 62 can be configured to output an electrical signal representative of light incident on the image sensor.

Optical indicia reading terminal 100 can further comprise an I/O interface which in the illustrative embodiment of FIG. 1 can be communicatively coupled to a wired connection 66. The I/O interface can be used to communicatively couple optical indicia reading terminal 100 to a companion device 68 such as a register and/or peripheral data capture devices in a point-of-sale (POS) application. Other configurations of the I/O interface may utilize wireless communication technology and/or contact-type features that do not require wires and/or wired connection 66. In certain applications of optical indicia reading terminal 100 for example, the companion device 68 may be provided by a docking station with corresponding mating contacts and/or connectors that are useful to exchange power and data, including image data captured by the imaging module 62.

Although not incorporated in the illustrative embodiment of FIG. 1, optical indicia reading terminal 100 can also comprise a number of peripheral devices, including a display for displaying such information as image frames captured by the terminal, a keyboard, and a pointing device.

Optical indicia reading terminal 100 can be used, for example, for bar code reading and decoding in POS and other applications. A skilled artisan would appreciate the fact that other uses of optical indicia reading terminal 100 are within the scope of this disclosure.

While FIG. 1 illustrates a hand held housing, a skilled artisan would appreciate the fact that other types and form factors of terminal housings are within the scope of this disclosure.

Figure 2:
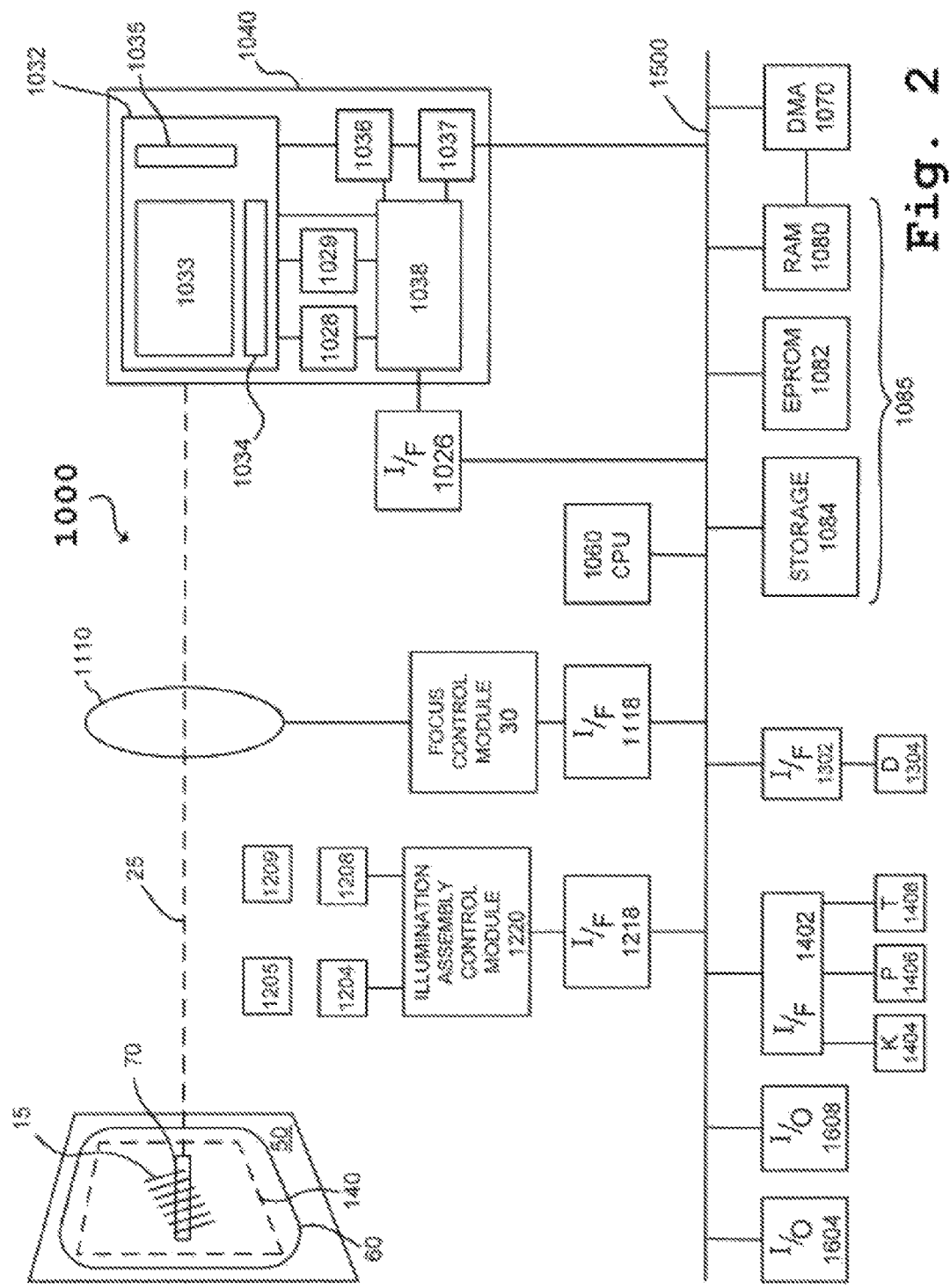
FIG. 2 illustrates a block diagram of one embodiment of the optical indicia reading terminal.

FIG. 2 illustrates a block diagram of one embodiment of the optical indicia reading terminal. Indicia reading terminal 100 can include a color image sensor 1032 comprising a multiple pixel image sensor array 1033 having pixels arranged in rows and columns, associated column circuitry 1034, and row circuitry 1035. In one embodiment, the image sensor array 1033 can be provided by a charge-coupled device (CCD) image sensor. In another embodiment, the image sensor array can be provided by a complementary metal-oxide semiconductor (CMOS) image sensor. A skilled artisan would appreciate the fact that other types of image sensors are within the scope of the invention.

Associated with the image sensor 1032 can be amplifier circuitry 1036, and an analog to digital converter 1037 which converts image information in the form of analog signals read out of image sensor 1033 into image information in the form of digital signals. Image sensor 1032 can also have an associated timing and control circuit 1038 for use in controlling e.g., the exposure period of image sensor 1032, and gain applied to the amplifier circuitry 1036. The noted circuit components 1032, 1036, 1037, and 1038 can be packaged into a common image sensor integrated circuit 1040.

In operation, the light falling on the surface of image sensor 1032 can cause accumulation of charge in each pixel. The indicia reading terminal 100 can be configured to read out analog signals representative of light incident on one or more pixels. The analog signals can subsequently be fed to the input of the analog-to-digital (A/D) converter 1037. The resulting digital values representative of the analog signals can be stored in a system memory such as RAM 1080. Image frame data stored in RAM 1080 can be in the form of multibit pixel values, with each multibit pixel value representing light incident on a pixel of image sensor array 1033. A memory 1085 of terminal 100 can include RAM 1080, a nonvolatile memory such as EPROM 1082 and a storage memory device 1084 such as may be provided by a flash memory or a hard drive memory.

In a further aspect, image sensor integrated circuit 1040 can be configured to output image data in a format supporting independent luminance and chrominance information. In one embodiment, image sensor integrated circuit 1040 can be configured to output image data in a YUV-family format (e.g., in YUV422 format).

According to YUV model, the Y component determines the brightness of the color (referred to as luminance or luma), while the U and V components determine the color itself (the chroma). U and V components are "color difference" signals of blue minus luma (B−Y) and red minus luma (R−Y). Value of Y component can range from 0 to 1 (or 0 to 255 in digital formats), while values of U and V components can range from −0.5 to 0.5 (or −128 to 127 in signed digital form, or 0 to 255 in unsigned form). Some YUV-based standards can further limit the ranges so the out-of-bounds values can indicate special information like synchronization.

YUV color representation can be computed from RGB color representation as follows:

$$Y = 0.299R + 0.587G + 0.114B$$

$$U = -0.147R - 0.289G + 0.436B$$

$$V = 0.615R - 0.515G - 0.100B$$

In another embodiment, image sensor integrated circuit 1040 can be configured to output image data in a $YC_BC_R$-family format ($YC_BC_R$ or $Y'C_BC_R$). Y denotes the luminance component and $C_B$ and $C_R$ are the blue-difference and red-difference chrominance components. Y' a non-linearly encoded light intensity.

$YC_BC_R$ color representation can be computed from RGB color representation as follows:

$$Y = 16 + 65,481R + 128,553G + 24,996B$$

$$C_B = 128 - 37,797R - 74,203G + 112B$$

$$C_R = 128 + 112R - 93,786G - 18,214B$$

Referring again to FIG. 2, indicia reading terminal 100 can include microprocessor 1060 which can be adapted to read out image data stored in memory 1080 and subject such image data to various image processing algorithms. Indicia reading terminal 100 can further include a direct memory access (DMA) controller 1070. In another embodiment, DMA controller 1070 can be an integral part of microprocessor 1060. DMA controller 1070 can be configured to perform data transfers between memory 1080 and peripheral devices (e.g., image sensor 1032), as well as between two memory spaces. In one embodiment, DMA controller 1070 can use idle cycles of microprocessor 1060 to perform data transfers. In another embodiment, DMA controller 1070 can operate independently from microprocessor 1060.

In one embodiment, image sensor integrated circuit 1040 can be configured to read-out analog signals representative of light incident on pixels of image sensor array 1033. Image sensor integrated circuit 1040 can be further configured to convert the analog signals into digital signals (e.g., employing A/D converter 1037) and to output the digital signals representative of light incident on pixels of image sensor array 1033.

Optical indicia reading terminal 100 (e.g., employing microprocessor 1060 and/or its associated circuitry, such as DMA controller 1070) can be configured to store a frame of monochrome image data in the terminal's memory (e.g., RAM 1080) by selectively acquiring a plurality of luminance signals from the digital signals being output by image sensor integrated circuit 1040. Optical indicia reading terminal 100 can be further configured to process the frame of monochrome image data for decoding decodable indicia.

As noted herein supra, image sensor integrated circuit 1040 can be configured to output image data in a YUV-family format (e.g., in YUV422 format).

In YUV422 format, the luminance signal Y occupy one data sampling, while chrominance signals UV occupy another data sampling. Thus, the data being output by image sensor integrated circuit 1040 can have one of the following formats:

YUYV YUYV . . .
UYVY UYVY . . .
YVYU YVYU . . .
VYUY VYUY . . .

Figure 3A:
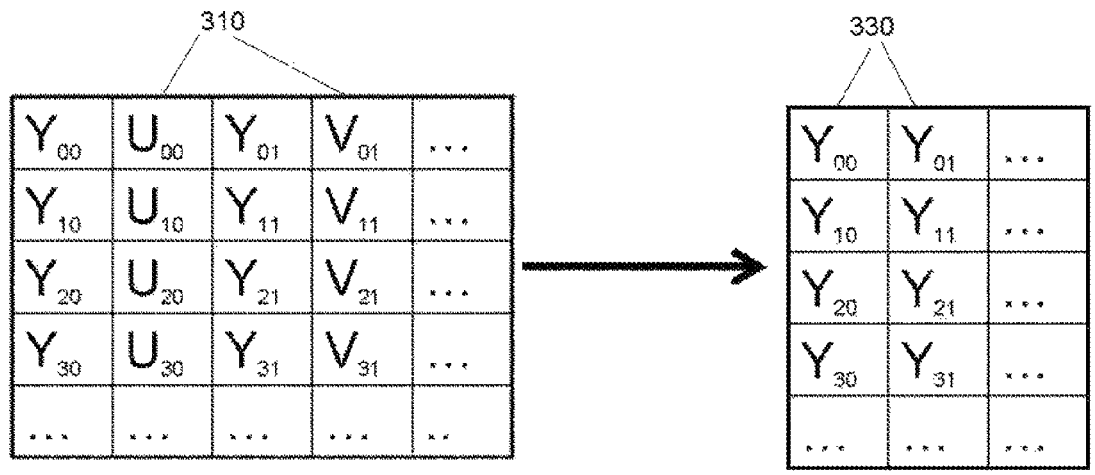
FIGS. 3a-3b illustrate two embodiments of a method of extracting the luminance signals from a YUV color image representation.
Figure 3B:
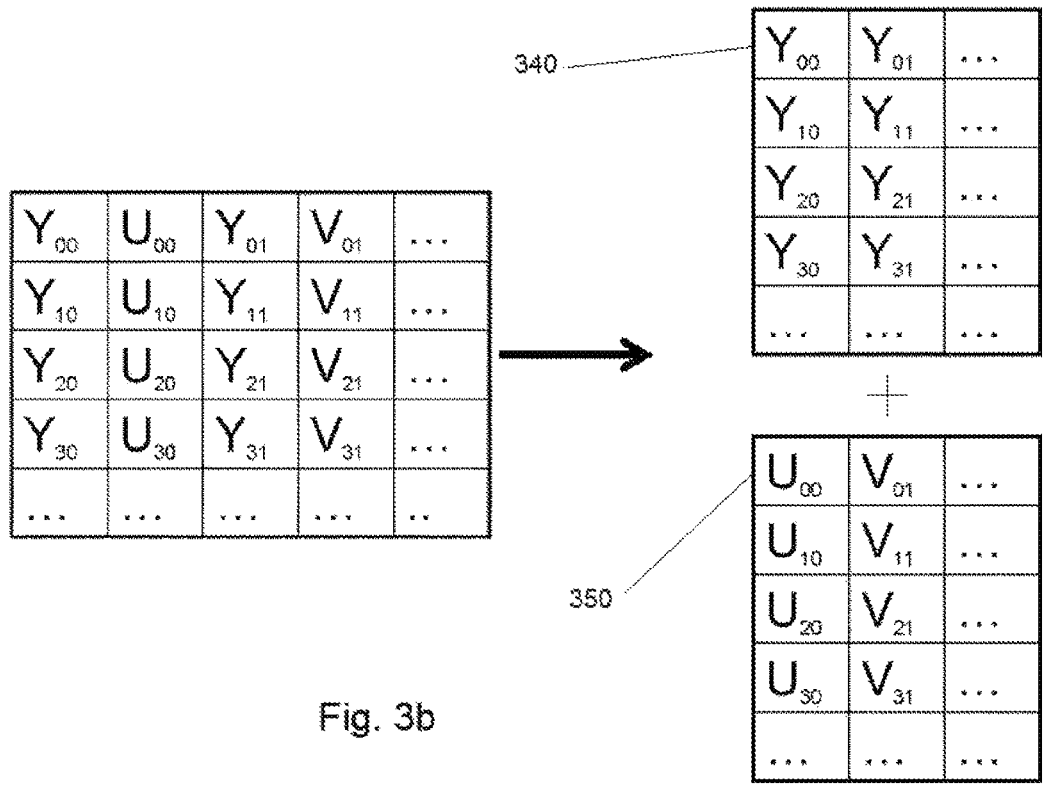

Optical indicia reading terminal 100 can be configured to only extract Y component from the stored frame of color image data and to store the resulting monochrome frame of image data in the terminal's memory for further processing. In one embodiment, schematically illustrated in FIG. 3a, optical indicia reading terminal 100 (e.g., employing microprocessor 1060 and/or its associated circuitry, such as DMA controller 1070) can be configured to discard the chrominance (UV) data 310 while only transferring the luminance (Y) data 330 from image sensor integrated circuit 1040. In another embodiment, schematically illustrated in FIG. 3b, optical indicia reading terminal 100 (e.g., employing microprocessor 1060 and/or its associated circuitry, such as DMA controller 1070) can be configured to transfer the luminance (Y) data and the chrominance (UV) data to different memory buffers 340, 350.

In a further aspect, de-interleaving the YUV data being output by image sensor integrated circuit 1040 can be performed by DMA controller 1070 performing a one-dimensional (1D) or two-dimensional (2D) DMA transfer.

A de-interleaving DMA transfer can be described by the following pseudo-code example:

```
for(i=0; i<N; i++)
    DstBuf[i] = SrcBuf[i*k];
```

In the above pseudo-code example, N memory units (e.g., bits, bytes, words, double words, etc.) are copied from a memory block starting at DstBuf address to a memory block starting at SrcBuf address, while skipping k−1 memory units at every transfer iteration in order to de-interleave the data. The de-interleaving effect can be achieved by multiplying the index of the source memory array by the number of memory units (e.g., bits, bytes, words, double words, etc.) to be skipped by the transfer operation in order to de-interleave the data. For example, if k=2 then every second memory unit (e.g., a bit, a byte, a word, a double word, etc.) will be copied into the destination memory buffer. Thus, in one example, for extracting the luminance component from a four-byte YUV422 representation having the form of YUYV, only the bytes located at positions 0, 2, 4, 6, 8, etc. in the source memory buffer should be copied to the destination memory buffer, which can be achieved using the above pseudo-code fragment.

In another embodiment, image sensor integrated circuit 1040 can be configured to output image data in a $YC_BC_R$-family format.

Figure 3C:
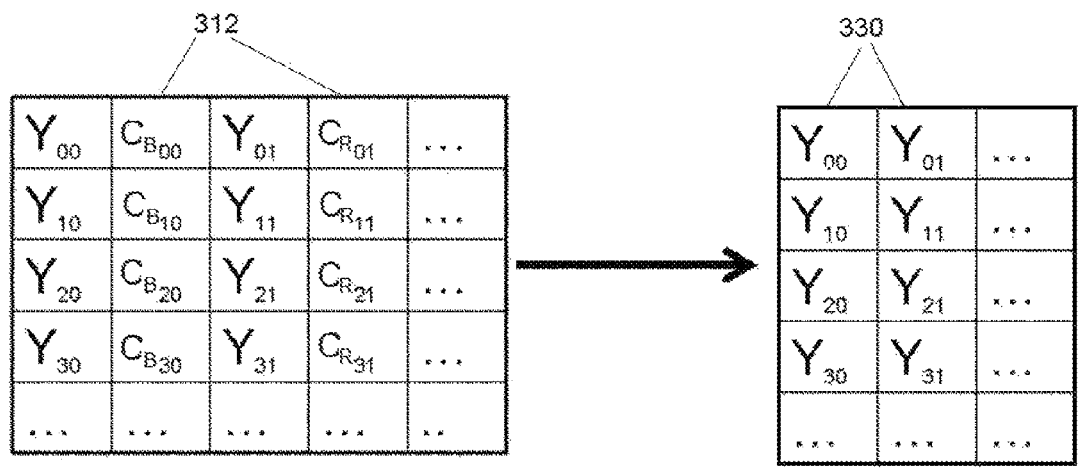
FIGS. 3c-3d illustrate two embodiments of a method of extracting the luminance signals from a $YC_BC_R$ color image representation.
Figure 3D:
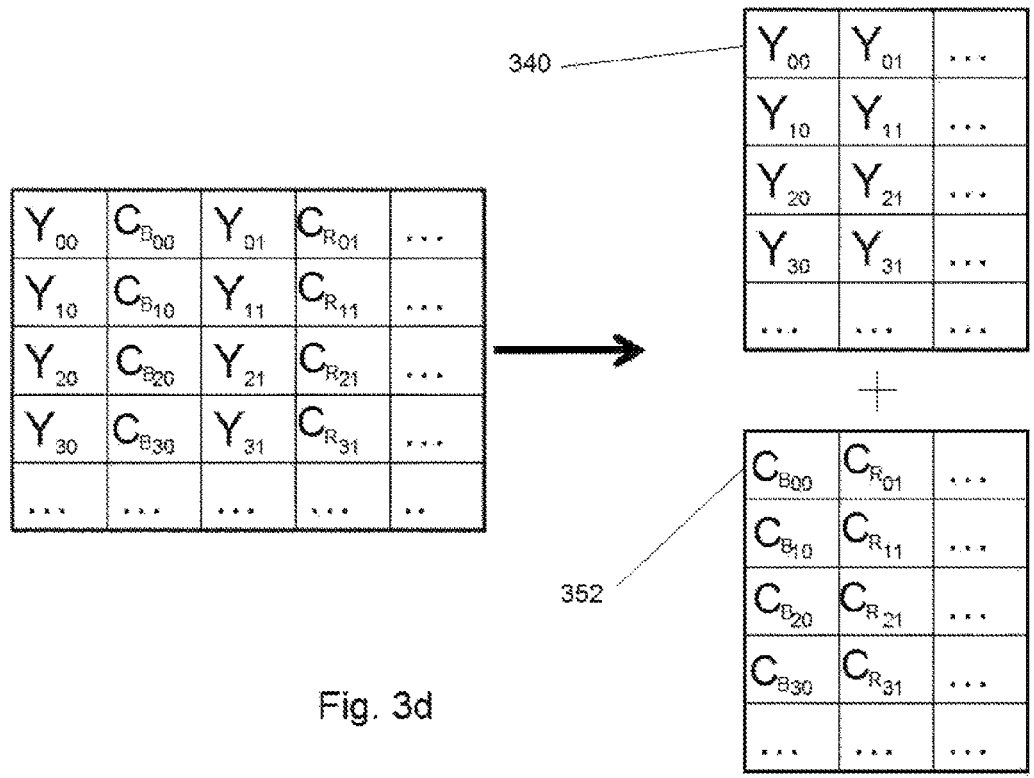

Optical indicia reading terminal 100 can be configured to only extract Y component from the stored frame of color image data and to store the resulting monochrome frame of image data in the terminal's memory for further processing. In one embodiment, schematically illustrated in FIG. 3c, optical indicia reading terminal 100 (e.g., employing microprocessor 1060 and/or its associated circuitry, such as DMA controller 1070) can be configured to discard the chrominance ($C_BC_R$) data 312 while only transferring the luminance (Y) data 330 from image sensor integrated circuit 1040. In another embodiment, schematically illustrated in FIG. 3d, optical indicia reading terminal 100 (e.g., employing microprocessor 1060 and/or its associated circuitry, such as DMA controller 1070) can be configured to transfer the luminance (Y) data and the chrominance ($C_BC_R$) data to different memory buffers 340, 352.

In a further aspect, de-interleaving the Y $C_BC_R$ data being output by image sensor integrated circuit 1040 can be performed by DMA controller 1070 performing a one-dimensional (1D) or two-dimensional (2D) DMA transfer as described herein supra.

In another aspect, the indicia reading terminal 100 can include a variable focus imaging lens 1110 for use in focusing an image of a decodable indicia located within a field of view 140 on a substrate 50 onto image sensor 1033. Imaging light rays can be transmitted about imaging axis 25. Variable focus imaging lens 1110 can be adapted to be capable of multiple best focus distances and multiple focal lengths. Variable focus imaging lens 1110 can be operative to provide a new best focus distance and/or focal length within a fraction of a frame time in response to an applied input control signal being applied to the variable focus imaging lens 1110. In one embodiment, the variable focus imaging lens 1110 can be provided by a deformable imaging lens, e.g., a deformable fluid lens or gel lens. In another embodiment, the variable focus imaging lens 1110 can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

The indicia reading terminal 100 can also include an illumination pattern light source bank 1204 for use in generating an illumination pattern 60 substantially corresponding to a field of view 140 of terminal 100 and an aiming pattern light source bank 1208 for use in generating an aiming pattern 70 on substrate 50. Shaping optics 1205 and 1209 can be provided for shaping light from bank 1204 and bank 1208 into pattern 60 and into pattern 70 respectively. In use, terminal 100 can be oriented by an operator with respect to a substrate 50 bearing decodable indicia 15 in such manner that aiming pattern 70 is projected on a decodable indicia 15. In the example of FIG. 2, decodable indicia 15 is provided by a 1D bar code symbol. Decodable indicia could also be provided by 2D bar code symbols or optical character recognition (OCR) characters.

Each of illumination pattern light source bank 1204 and aiming pattern light source bank 1208 can include one or more light sources. Variable focus imaging lens 1110 can be controlled with use of focus control module 30 and the illumination assembly comprising illumination pattern light source bank 1204 and aiming pattern light source bank 1208 can be controlled with use of illumination assembly control module 1220. Focus control module 30 can send signals to variable focus imaging lens 1110 e.g., for changing a best focus distance and/or a focal length of variable focus imaging lens 1110. Illumination assembly control module 1220 can send signals to illumination pattern light source bank 1204 e.g., for changing a level of illumination output by illumination pattern light source bank 1204.

In one example, the indicia reading terminal 100 can be adapted so that illumination assembly control module 1220 controls light source bank 1204 to have a relatively lower level of illumination output when the best focus distance of imaging lens 1110 is set to a first shorter best focus distance, and a relatively higher level of illumination output when the best focus distance of imaging lens 1110 is set at a longer best focus distance. Such variable illumination settings can be varied within a time that trigger signal 502 remains active. The variable illumination level settings can be synchronized to the certain lens settings set forth in connection with the various configurations described herein infra.

Indicia reading terminal 100 can also include a number of peripheral devices, e.g., a display 1304 for displaying such information as captured image frames, keyboard 1404, pointing device 1406, and trigger 1408 which may be used to make active a trigger signal 502 for activating frame readout and/or certain decoding processes. The indicia reading terminal 100 can be adapted so that activation of trigger 1408 activates trigger signal 502 and initiates a decode attempt.

Indicia reading terminal 100 can also include various interface circuits for coupling the peripheral devices to system address/data bus (system bus) 1500, for communication with microprocessor 1060 which can also be coupled to system bus 1500. The indicia reading terminal 100 can include circuit 1026 for coupling image sensor timing and control circuit 1038 to system bus 1500, interface circuit 1118 for coupling focus control module 30 to system bus 1500, interface circuit 1218 for coupling illumination control assembly 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, indicia reading terminal 100 can include one or more I/O interfaces 1604, 1608 for providing communications with external devices (e.g., a cash register server, a store server, an inventory facility server, a peer terminal 100, a local area network base station, or a cellular base station). I/O interfaces 1604, 1608 can be interfaces of any combination of known computer interfaces, e.g., Ethernet (IEEE 802.3), USB, IEEE 802.11, Bluetooth, CDMA, GSM.

Referring now to FIGS. 4 and 5, an imaging module 300 for supporting components of terminal 100 can include image sensor integrated circuit 1040 disposed on a printed circuit board 1802 together with illumination pattern light source bank 1204 and aiming pattern light source bank 1208 each shown as being provided by a single light source. Imaging module 300 can also include containment 1806 for image sensor integrated circuit 1040, and housing 1810 for housing imaging lens 1110. Imaging module 300 can also include optical plate 1814 having optics for shaping light from bank 1204 and bank 1208 into predetermined patterns. Imaging module 300 can be disposed in a hand held housing 11, an example of which is shown in FIG. 6. Disposed on hand held housing 11 can be display 1304, trigger 1408, pointing device 1406, and keyboard 1404.

A small sample of systems methods and apparatus that are described herein is as follows:

A1. An optical indicia reading terminal comprising:
  a microprocessor;
  a memory communicatively coupled to said microprocessor;
  an image sensor integrated circuit communicatively coupled to said memory, said image sensor integrated circuit including a two-dimensional color image sensor including a plurality of pixels;
  a housing encapsulating said two-dimensional image sensor;
  wherein said image sensor integrated circuit is configured to output a plurality of digital signals, each digital signal of said plurality of digital signals being representative of light incident on at least one pixel of said plurality of pixels;
  wherein said optical indicia reading terminal is configured to store in said memory a frame of monochrome image data by selectively acquiring a plurality of luminance signals from said plurality of digital signals, each luminance signal of said plurality of luminance signals being representative of a luminance of light incident on at least one pixel of said plurality of pixels; and
  wherein said optical indicia reading terminal is configured to process said frame of image data for decoding decodable indicia.

A2. The optical indicia reading terminal of A1, wherein said plurality of digital signals is provided by a plurality of YUV signals.

A3. The optical indicia reading terminal of A1, wherein said plurality of digital signals is provided by a plurality of $YC_BC_R$ signals.

A4. The optical indicia reading terminal of A1, wherein said optical indicia reading terminal is configured to acquire said plurality of luminance signals by reading said plurality of digital signals and discarding chrominance signals.

A5. The optical indicia reading terminal of A1, wherein said optical indicia reading terminal further comprises a direct memory access (DMA) controller, said DMA controller configured to acquire said plurality of luminance signals from said plurality of digital signals.

A6. The optical indicia reading terminal of A1, wherein said optical indicia reading terminal further comprises a direct memory access (DMA) controller, said DMA controller configured to acquire said plurality of luminance signals from said plurality of digital signals by performing at least one one-dimensional DMA transfer.

A7. The optical indicia reading terminal of A1, wherein said optical indicia reading terminal further comprises a direct memory access (DMA) controller, said DMA controller configured to acquire said plurality of luminance signals from said plurality of digital signals by performing at least one two-dimensional DMA transfer.

A8. The optical indicia reading terminal of A1 further comprising an imaging lens configured to focus an image of a target decodable indicia onto said two-dimensional image sensor.

A9. The optical indicia reading terminal of A1 further including a trigger for activating said image sensor integrating circuit.

A10. The optical indicia reading terminal of A1, wherein said image sensor integrated circuit further comprises at least one of: an amplifier, an analog-to-digital converter, and a control circuit.

A11. The optical indicia reading terminal of A1, wherein said color image sensor comprises a multiple pixel image sensor array having pixels arranged in rows and columns, a column circuitry, and a row circuitry.

A12. The optical indicia reading terminal of A1, wherein said color image sensor comprises a multiple pixel image sensor array having pixels arranged in rows and columns, said image sensor array provided by one of: a charge-coupled device (CCD) image sensor and a complementary metal-oxide semiconductor (CMOS) image sensor.

While the present invention has been described with reference to a number of specific embodiments, it will be understood that the true scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. An apparatus, comprising:
  a microprocessor;
  a memory communicatively coupled to said microprocessor;
  an image sensor integrated circuit communicatively coupled to said memory, said image sensor integrated circuit including a two-dimensional color image sensor including a plurality of pixels;

an imaging lens configured to focus an image onto said two-dimensional image sensor;

a direct memory access (DMA) controller; and a housing encapsulating said two-dimensional color image sensor;

wherein said image sensor integrated circuit is configured to output a plurality of digital signals, each digital signal of said plurality of digital signals being representative of light incident on at least one pixel of said plurality of pixels;

wherein said apparatus is configured to store in said memory a frame of monochrome image data by selectively acquiring a plurality of luminance signals from said plurality of digital signals, each luminance signal of said plurality of luminance signals being representative of a luminance of light incident on at least one pixel of said plurality of pixels;

wherein said DMA controller configured to acquire said plurality of luminance signals from said plurality of digital signals; and wherein said apparatus is configured to decode said frame of monochrome image data.

2. The apparatus of claim 1, wherein said plurality of digital signals is provided by a plurality of YUV signals.

3. The apparatus of claim 1, wherein said plurality of digital signals is provided by a plurality of $YC_B C_R$ signals.

4. The apparatus of claim 1, wherein said apparatus is configured to acquire said plurality of luminance signals by reading said plurality of digital signals and discarding chrominance signals.

5. The apparatus of claim 1, wherein said DMA controller is configured to acquire said plurality of luminance signals from said plurality of digital signals by performing at least one one-dimensional DMA transfer.

6. The apparatus of claim 1, wherein said DMA controller is configured to acquire said plurality of luminance signals from said plurality of digital signals by performing at least one two-dimensional DMA transfer.

7. The apparatus of claim 1, comprising a trigger for activating said image sensor integrating circuit.

8. The apparatus of claim 1, wherein said image sensor integrated circuit further comprises at least one of: an amplifier, an analog-to-digital converter, and a control circuit.

9. The apparatus of claim 1, wherein said color image sensor comprises a multiple pixel image sensor array having pixels arranged in rows and columns, a column circuitry, and a row circuitry.

10. The apparatus of claim 1, wherein said color image sensor comprises a multiple pixel image sensor array having pixels arranged in rows and columns, said image sensor array provided by one of: a charge-coupled device (CCD) image sensor, and a complementary metal-oxide semiconductor (CMOS) image sensor.

11. An apparatus, comprising:
a microprocessor;
a source memory communicatively coupled to said microprocessor;
an image sensor integrated circuit communicatively coupled to said source memory, said image sensor integrated circuit including a two-dimensional color image sensor including a plurality of pixels;
an imaging lens configured to focus an image onto said two-dimensional image sensor;
a housing encapsulating said two-dimensional color image sensor and said imaging lens; and
a direct memory access (DMA) controller receiving image data from said source memory, said image data comprising independent luminance data and chrominance data;
wherein said direct memory access controller selectively acquires a plurality of luminance signals from said image data.

12. The apparatus according to claim 11, further comprising a destination memory buffer in electronic communication with said direct memory access controller, wherein said direct memory access controller transmits luminance components of said image data to said destination memory buffer.

13. The apparatus according to claim 11, wherein said direct memory access controller is configured to operate according to a de-interleaving DMA transfer of luminance data from said source memory to said destination memory buffer.

14. The apparatus according to claim 11, further comprising separate memory buffers for chrominance data and luminance data.

15. A method, comprising:
storing software on an apparatus to configure a direct memory access controller installed on the apparatus;
operating the direct memory access controller with the software to extract either luminance or chrominance data from image data independently of each other;
storing the luminance or chrominance data in a destination memory buffer; and
outputting, with an image sensor integrated circuit, image data based on an image captured with the apparatus.

16. The method according to claim 15, comprising programming the software such that the direct memory access controller retrieves image data from selected addresses in a source memory storing the image data.

17. The method according to claim 15, comprising programming the software such that the direct memory access controller extracts luminance or chrominance data by skipping select memory positions in a source memory storing the image data.

18. The method according to claim 15, programming the software to extract an intensity value, Y' from the image data.

19. The method according to claim 15, wherein the apparatus comprises:
memory on which the software is stored; and
the image sensor integrated circuit.

20. The method according to claim 15, wherein the apparatus comprises a trigger, and the method comprises capturing an image in response to activation of the trigger.

* * * * *